United States Patent [19]
Blechinger

[11] Patent Number: 4,773,756
[45] Date of Patent: Sep. 27, 1988

[54] IMAGING SPECTROMETER HAVING A WIDE SPECTRAL RANGE

[75] Inventor: Fritz Blechinger, Munich, Fed. Rep. of Germany

[73] Assignee: Messerschmitt-Boelkow-Blohm GmbH, Munich, Fed. Rep. of Germany

[21] Appl. No.: 44,597

[22] Filed: Apr. 30, 1987

[30] Foreign Application Priority Data

Apr. 30, 1986 [DE] Fed. Rep. of Germany ....... 3614639

[51] Int. Cl.$^4$ .............................................. G01J 3/18
[52] U.S. Cl. ..................................... 356/334; 356/328
[58] Field of Search ................................ 356/328, 334

[56] References Cited
U.S. PATENT DOCUMENTS 3,015,984  1/1962  Martin ............................. 356/334 X

OTHER PUBLICATIONS

Schmidtke et al. "Parabolic Telescope & Spectrometer Combination" Applied Optics, vol. 19 #11, 1 Jun. 1980, pp. 1822–1832.

Primary Examiner—Vincent P. McGraw
Attorney, Agent, or Firm—W. G. Fasse; D. H. Kane, Jr.

[57] ABSTRACT

A compact, lightweight, yet sturdy imaging spectrometer, especially for use in satellites, flying bodies and the like, has elliptical mirrors for its objective or lens, for its collimator, and for its imager. The collimator and imager are formed by the same mirrors which reflect the beam twice. The optical arrangement of the objective or lens, the collimator, and the imager is such that any bending of an object strip by a diffraction lattice or grid is compensated. Such a spectrometer is usable for a wide field and wide spectral range, including the non-visible range.

4 Claims, 3 Drawing Sheets

IMAGING SPECTROMETER HAVING A WIDE SPECTRAL RANGE

FIELD OF THE INVENTION

The invention relates to an imaging spectrometer having an objective, a slit, a collimator, a lattice, and an imager.

DESCRIPTION OF THE PRIOR ART

Such spectrometers are known. The light beam to be analyzed is focussed by the objective onto a slit. A collimator directs the parallel light onto a lattice or grid structure where the light is diffracted to be focussed by an imager into an image plane as a spectrum. The known structures of this type are relatively heavy and require a substantial volume or space. Therefore, known spectrometers of this type are not well suited for use under limited available space conditions.

OBJECTS OF THE INVENTION

In view of the foregoing it is the aim of the invention to achieve the following objects singly or in combination:

to provide an image spectrometer which is small, lightweight, and rugged or robust, especially for use in satellites and flying bodies;

to construct such an imaging spectrometer so that it has a wide useful spectral range including radiation in the invisible spectral range portion on either side of the visible range;

to arrange certain spectrometer components in such a way that they can perform two different functions; and to provide a large field of view ($\pm 16°$).

SUMMARY OF THE INVENTION

The foregoing objectives have been achieved according to the invention by an imaging spectrometer wherein the objective, the collimator, and the imager are constructed of aspheric mirrors. Preferably, the same mirror arrangement forms the collimator and the imager, whereby this mirror arrangement reflects the beam twice.

According to a preferred embodiment of the present spectrometer of the invention the objective comprises a first convex mirror and a second concave mirror, whereby the beam to be analyzed travels at an angle to the optical axis of the two mirrors onto the convex mirror, thereby bypassing the concave mirror. The convex mirror guides or reflects the light beam onto the concave mirror which in turn directs the light past the convex mirror onto an imaging plane where the beam is focussed into the slit as a bent or curved image strip. The collimator comprises a concave and a convex mirror which directs the light coming from the slit in parallel onto the lattice or grid structure. The same mirrors which function as the collimator now function as the imager when they back-focus the parallel light that has been reflected and diffracted by the lattice or grid structure, whereby the diffracted image of the list is focussed back onto the image plane or light stop. Preferably, the optical axes of the objective and of the collimator/imager extend in parallel to each other and are spaced from each other by a determined spacing.

In order to compensate for the curvature of the diffracted image of the slit, the focal distance of the objective and of the collimator have a relationship within the range of 1:1 and 1:10.

The features of the invention result in a substantial saving of space and weight, while simultaneously achieving the advantage of avoiding mechanically movable parts, as well as expensive structural components.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
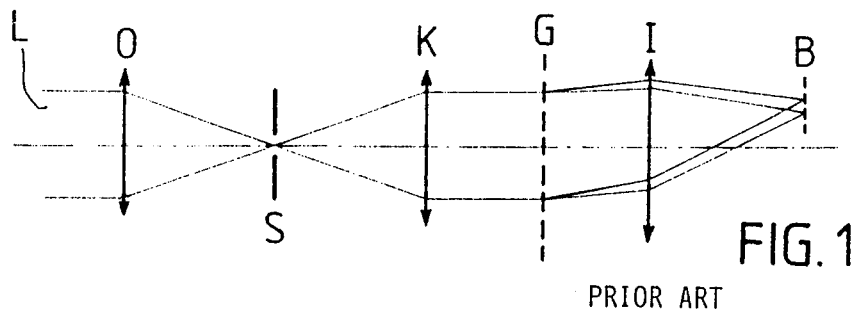
FIG. 1 shows the principle of an imaging conventional spectrometer.

FIG. 1 shows the principle of an imaging, conventional spectrometer. The incoming beam L of light to be analyzed passes through the objective O which focusses the light beam onto a slit S. A collimator K receives the light through the slit S. The collimator orients the light in parallel again and directs it onto a lattice or grid structure G. The lattice G diffracts the parallel light and transmits it to an imager I which focusses the diffracted light as a spectrum in the image plane B.

Figure 3:
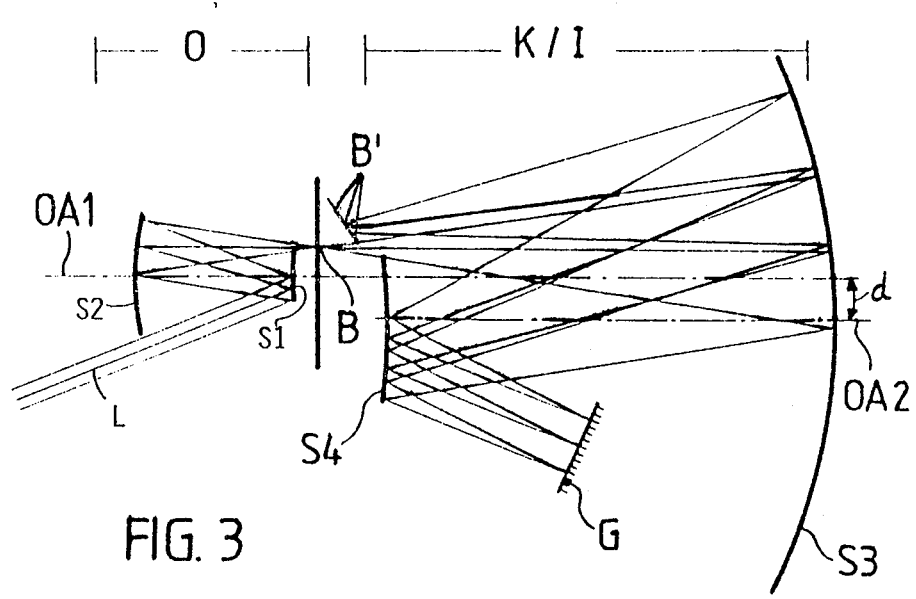
FIG. 3 illustrates the complete system of an imaging spectrometer according to the invention.

According to the invention the individual optical means, namely the objective, the collimator, and the imager, are constructed as four mirrors which are all aspheric and which, for example, may have the shape of a rotational ellipsoid. The complete imaging spectrometer comprises two parallel optical axes OA1 and OA2 as shown in FIG. 3. These two optical axes are spaced from each other by a determined spacing d in the range of 15 mm to 30 mm.

Figure 2A:
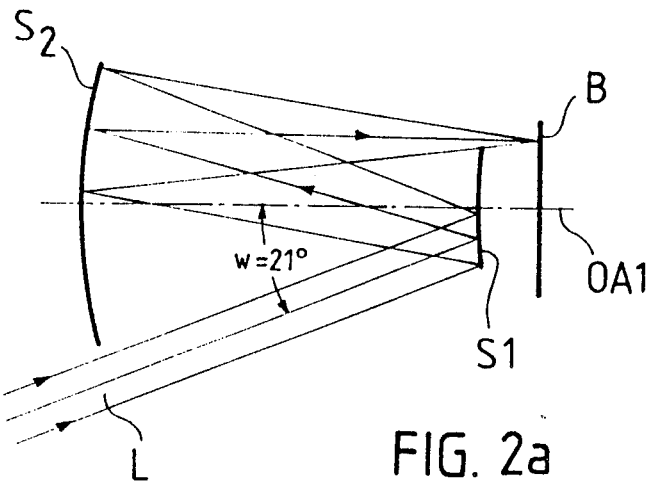
FIG. 2a shows a schematic section through a y-z-plane of a double mirror objective.
Figure 2B:
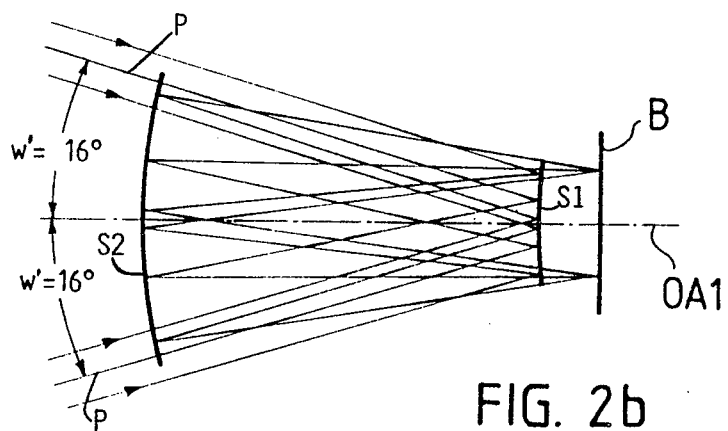
FIG. 2b shows a schematic section through the x-z-plane of a double mirror objective.

Referring to FIGS. 2a and 2b, the objective copprises a first convex mirror S1 and a second concave mirror S2 as well as an imaging plane B. The light L coming from an object assumed to be locatd at infinity,impinges onto the convex mirror S1 at an angle w relative to the first optical axis OA1 of the objective, whereby the light L can bypass the second concave mirror S2. The line image of an object strip appears in the imaging plane B perpendicularly to the plane defined by the sheet of the drawing of FIG. 2a. As a result, an object initially having a straight image is caused to be curved in the image plane B. The angle w is, for example 21°. In FIG. 2b, the angle w' between the optical axis OA1 and a plane P defined by the incoming light is, for example, 16°.

Figure 2C:
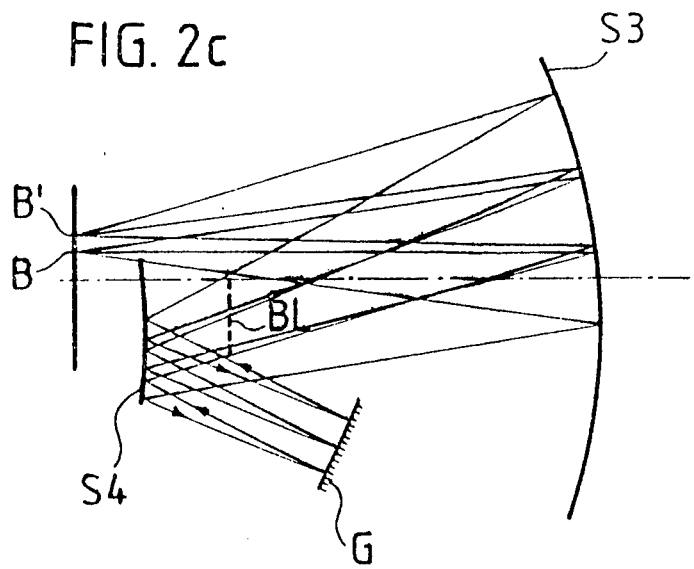
FIG. 2c illustrates the schematic optical arrangement of the collimator/imager system in a spectrometer according to the invention.

FIG. 2c shows the optical arrangement of the collimator/imager according to the invention, comprising a third concave mirror S3 and a fourth convex mirror S4. The entry slit in the imaging plane B extends perpendicularly to the plane of the sheet on which FIG. 2 is illustrated. The light first passes through the collimator by way of a double reflection by the mirrors S3 and S4, whereupon the collimated light impinges on the plane lattice or grid G. The lattice G diffracts and reflects the light back onto the mirror S4 and in turn onto the mirror S3. The diffracted image of the slit in the image plane B is produced at B' where it can be analyzed by suitable detectors.

As shown in FIG. 2c, the collimator and the imaging system are thus realized by a single optical arrangement comprising the two mirrors S3 and S4. The light passes twice through this optical system which is telecentric. The mirrors S3 and S4 are ellipsoids of rotational symmetry. The real shutter or light stop of the system is shown at BL.

In the illustrated arrangement the lattice G is not located at the position of the shutter or light stop. Such a feature would be desirable for an optimal telecentric imaging. However, it has been found that this slight difference between an optimal desirability and reality is greatly outweighed by the advantages achieved by the invention in the form of a reduced weight, a reduced volume, a substantial sturdiness, and wide field capability.

A straight entrance slit in the image plane B is imaged as a curved line in the image plane B'. The causes or factors that influence this effect in the collimator/imager system are as follows:

(a) the grid or lattice G is not located in the shutter or light stop position BL;
(b) the light passes at a slant as indicated by the angle w' relative to the optical axis OA1 through the system; and
(c) the curvature imposed on a straight line by the lattice or grid structure G.

The influences (a) and (b) are independent of the wave length of the incoming light L. However, the influence (c) depends on the wave length of the incoming light L. It further applies that a curved slit image in the image plane B is imaged as a straight line in the image plane B'.

FIG. 3 shows the entire optical system of an imaging spectrometer according to the invention. As mentioned, the objective section O and the collimator/imager section K/I produce curved image strips. However, such curving of the image strips can be compensated by a suitable combination of the two systems O and K/I. In the system of FIG. 3 the compensation is obtained if the ratio of the focal length of the objective and of the collimator is as follows:

$$\frac{\text{Objective}}{\text{Collimator}} \approx \frac{1}{3}$$

Without taking any lattice diffraction into account, that is, it is assumed that the lattice G acts as a plane mirror, a straight object strip on the earth's surface, for example, is again imaged as a straight image strip B'. Only the intermediate image in the slit or image plane B is curved. However, the influence of the slit curvature or bending of the lattice G remains undisturbed.

The gap curvature or bending KG of the lattice G depends on the wave length λ of the incoming light and increases with an increasing wave length λ. It is possible to compensate the slit curvature KG of the lattice G for one wave length by providing an incomplete equalization of the curvature between the objective and the collimator/imager. Thus, any remaining curvatures for other wave lengths are rather small.

Figure 4:
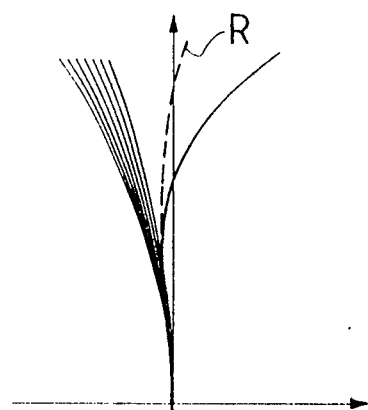
FIG. 4 illustrates the lattice or grid structure which causes the curvature of an initially straight object line through the entire system of a spectrometer according to the invention.

FIG. 4 shows the various bending or curvature causing influences in the imaging plane B' and the resulting remainder bending or curvature for the entire system of FIG. 3. As mentioned, KG designates the curvature of a straight slit in the imaging plane as caused by the lattice G. The dependency of the curvature on the wave length λ is apparent from FIG. 4. KO designates the slit curvature of the entire system objective/collimator/imager in the imaging plane. The dashed line R designates the slit curvature resulting from the combination of the curvature KG with the curvature KO. The focal length F' of the collimator/imager corresponds in the given example of 90 mm=F'.

Figure 5:
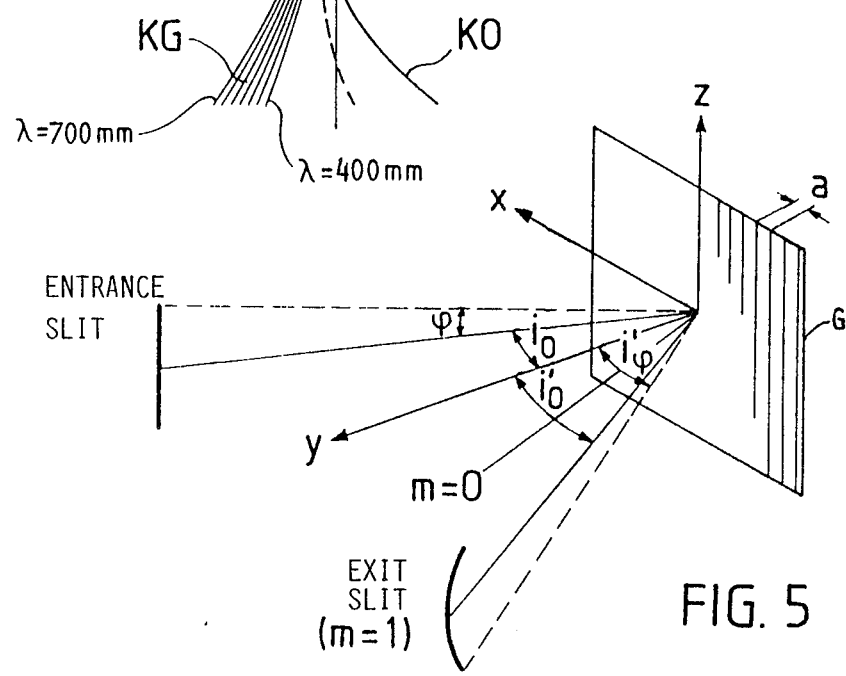
FIG. 5 illustrates the details of the geometric conditions at a plane diffraction lattice or grid structure.

FIG. 5 illustrates the geometric conditions at the diffraction lattice G. The following conditions apply:

$$\sin i'_o = \frac{m \cdot \lambda}{a} - \sin i_o \qquad \text{Equation (1)}$$

$$\sin i'_\phi = \sin i_o (\cos\phi - 1) + \cos\phi \sin i'_o \qquad \text{Equation (2)}$$

wherein
m is a diffraction number or diffraction order;
λ is the wave length of the incoming light L; and
"a" is the line or bar spacing of the lattice G.

According to Equations (1) and (2) the slit bending or curvature caused by the lattice G depends on the following parameters:

(a) diffraction number m;
(b) lattice constant N=(1/a); and
(c) wave length λ.

Depending on the respectively selected spectral resolution, different lattice constants N are required which in turn cause different slit curvatures. The compensation is accomplished by the adaptation of the focal lengths of the objective and collimator imager. Depending on the particular application of the spectrometer, the focal length ratio may be within the following range.

$$\frac{1}{1} \geq \frac{\text{Objective}}{\text{Collimator}} \geq \frac{1}{10.}$$

Example of an Embodiment

The following table provides example data of a system according to FIG. 3. These values are variable and are determined primarily by the lattice constant N. These values can be adapted to the range of the focal length ratios thus becoming necessary.

| Focal length: −31.50619 [mm] | | | | |
|---|---|---|---|---|
| Area | Radius [mm] | Spacing [mm] | Diameter [mm] | Remark |
| 1 | 93.5303 | −65.940 | 20.00 | mirror |
| 2 | 90.8248 | 76.019 | 47.50 | mirror |
| 3 | plane | 217.280 | 25.91 | slit plane |
| 4 | −259.4841 | −188.931 | 220.00 | mirror |
| 5 | −267.2153 | 80.000 | 60.00 | mirror |
| 6 | plane | −80.000 | 40.00 | lattice |
| 7 | −267.2153 | 188.931 | 25.91 | mirror |
| 8 | −259.4841 | −217.154 | 25.91 | mirror |

| Special Parameters: | | | | |
|---|---|---|---|---|
| Area | DX | DY | Y-TILT | CC |
| 1 | 0.00 | 0.00 | 0.0000 | 5.50 |
| 2 | 0.00 | 0.00 | 0.0000 | 0.193 |

-continued

| | | | | |
|---|---|---|---|---|
| 4 | 0.00 | −21.68 | 0.0000 | 0.193 |
| 5 | 0.00 | −21.68 | 0.0000 | 5.50 |
| 6 | 0.00 | −70.00 | −24.0000 | 0.00 |
| 7 | 0.00 | −21.68 | 0.0000 | 5.50 |
| 8 | 0.00 | −21.68 | 0.0000 | 0.193 |

DX = offset of surface along x-axis
DY = offset of surface along y-axis
Y-TILT = tilt of surface
CC = conic constant that can be derived from the following formula $$z = \frac{c \cdot S^2}{1 + \sqrt{1 - (CC + 1) c^2 S^2}}$$

wherein c = curvature of said surface
$S^2 = x^2 + y^2$ coordinates in a rectangular three-dimensional coordinate system x, y, z.

Although the invention has been described with reference to specific example embodiments, it will be appreciated that it is intended to cover all modifications and equivalents within the scope of the appended claims.

What I claim is:

1. An imaging spectrometer having optical axis means, comprising a lattice, a slit, and aspheric mirror means for forming an objective, a collimator, and an imager, wherein said aspheric mirror means comprise a first aspheric mirror arrangement forming said objective and a second aspheric mirror arrangement forming said collimator and said imager simultaneously, wherein said first aspheric mirror arrangement comprises a first convex mirror and a second concave mirror, said first convex and second concave mirrors being arranged relative to each other in such positions that a beam to be analyzed is received on the surface of said first convex mirror at an angle to said optical axis means so that said beam may bypass said second concave mirror to reach said first convex mirror which reflects said beam onto said second concave mirror, an imaging plane including said slit arranged to receive said beam from said second concave mirror as the beam bypasses said first convex mirror, said second concave mirror focussing said beam as a bent strip into said slit in said imaging plane, said second aspheric mirror arrangement comprising a third concave mirror and a fourth convex mirror arranged for receiving said beam through said slit on said third concave mirror for reflecting said beam onto said fourth convex mirror and for reflecting said beam in parallel onto said lattice, said lattice being arranged for reflecting said back-focussing the now diffracted beam onto said imaging plane with the aid of said third and fourth mirrors now functioning as an imager to form a diffracted image of said slit in said image plane.

2. The imaging spectrometer of claim 1, wherein said optical axis means comprise a first optical axis defined by said first and second mirrors forming said objective, and a second optical axis defined by said third and fourth mirrors forming said collimator and said imager, said first and second optical axes being spaced from each other and extending in parallel to each other.

3. The imaging spectrometer of claim 2, wherein said objective has a first focal distance and said collimator has a second focal distance, said first focal distance having a ratio to said second focal distance within the range of 1:1 to 1:10.

4. The imaging spectrometer of claim 1, wherein said slit and said diffracted image are located in one plane which is said imaging plane.

* * * * *

UNITED STATES PATENT AND TRADEMARK OFFICE
CERTIFICATE OF CORRECTION

PATENT NO. : 4,773,756

DATED : September 27, 1988

INVENTOR(S) : Fritz Blechinger

It is certified that error appears in the above-identified patent and that said Letters Patent is hereby corrected as shown below:

In Claim 1, Column 6, Line 15, replace "said" by --and--.

Signed and Sealed this

Seventh Day of February, 1989

*Attest:*

DONALD J. QUIGG

*Attesting Officer*  *Commissioner of Patents and Trademarks*